Nov. 11, 1969 E. F. TOWNSEND ET AL 3,477,896
METHOD AND APPARATUS FOR REMOVING BACKING SHEETS
FROM THIN LAMINATES
Filed June 10, 1965 4 Sheets-Sheet 1
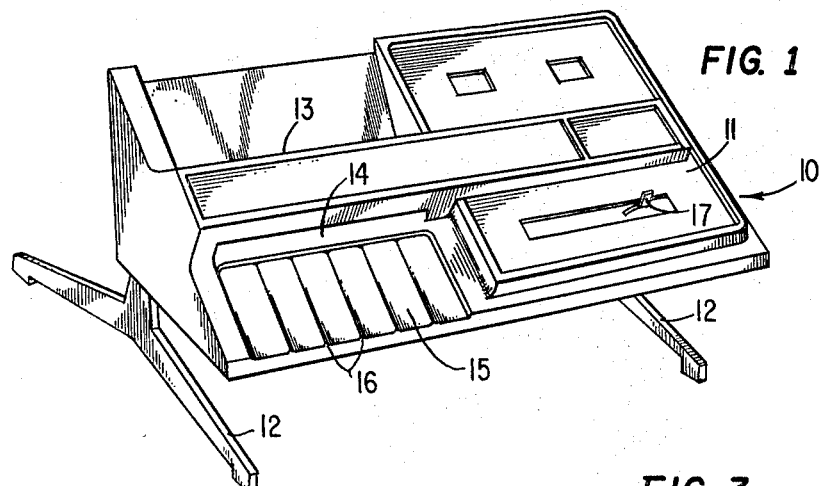
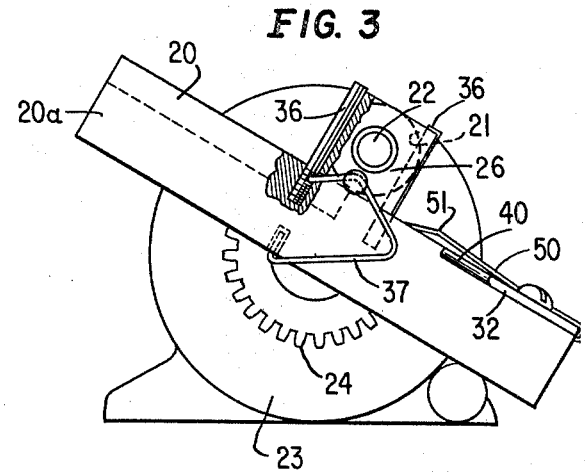
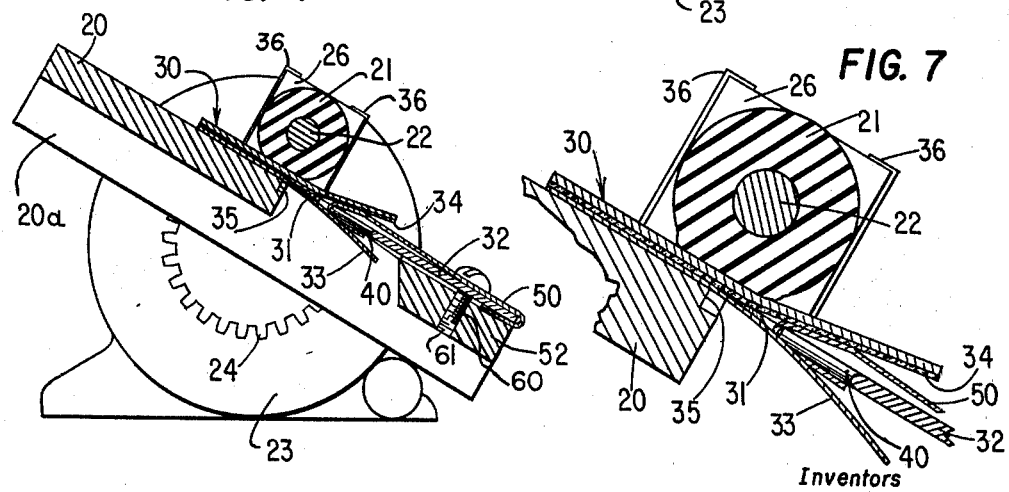
Inventors
Edwin F. Townsend
Stanley C. Young
By Wolfe, Hubbard, Voit & Osann.
ATTYS.

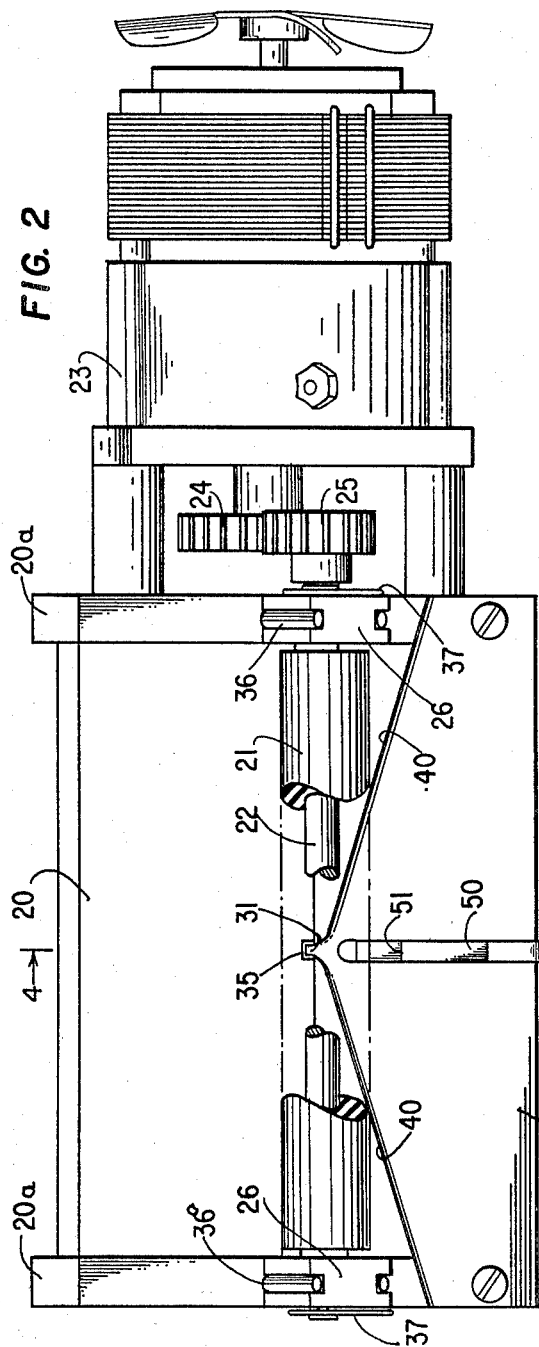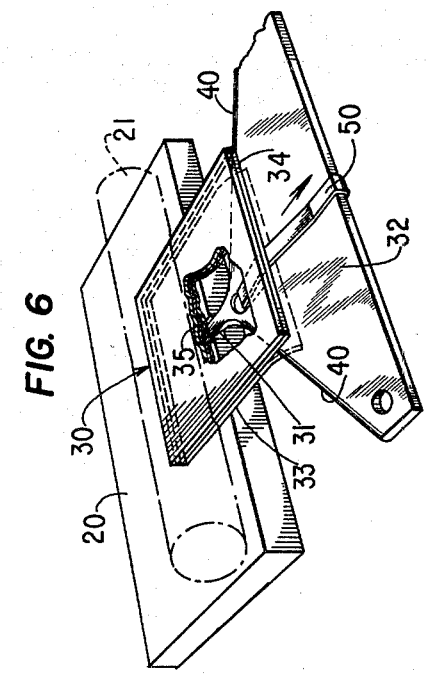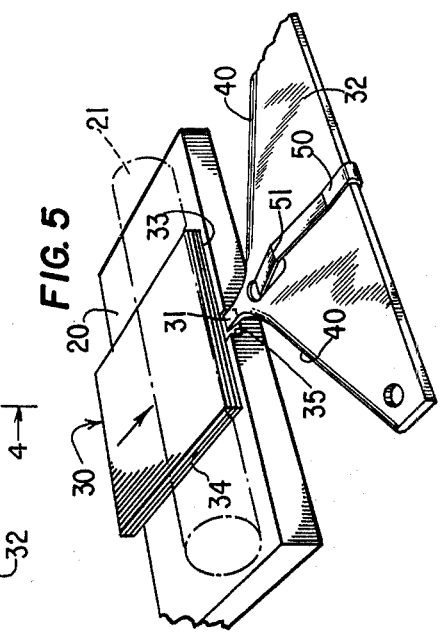

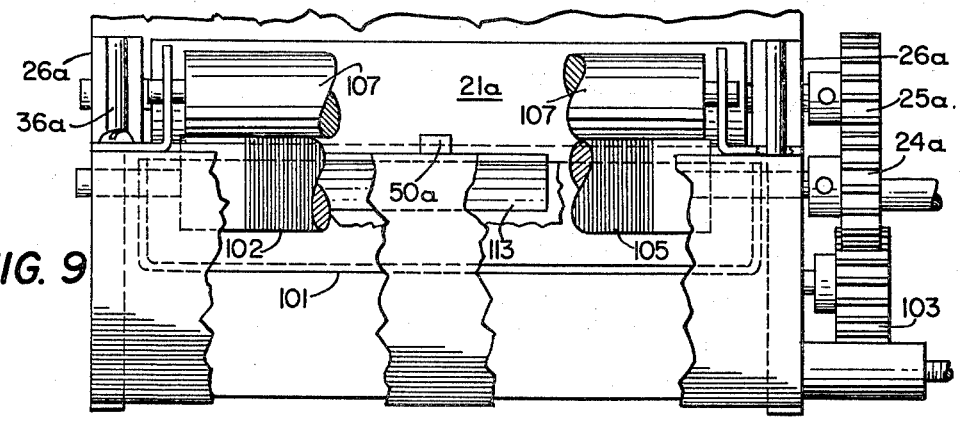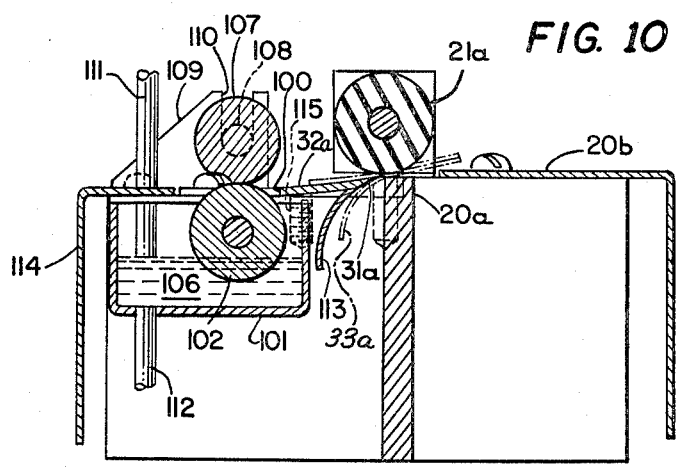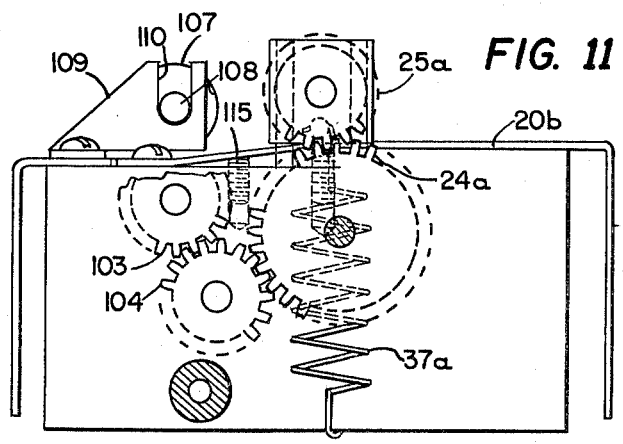

United States Patent Office 3,477,896
Patented Nov. 11, 1969

3,477,896
METHOD AND APPARATUS FOR REMOVING BACKING SHEETS FROM THIN LAMINATES
Edwin F. Townsend, Palos Hills, and Stanley C. Young, Oaklawn, Ill., assignors to Easco Leasing Corporation, Midlothian, Ill., a corporation of Illinois
Continuation-in-part of application Ser. No. 366,754, May 12, 1964. This application June 10, 1965, Ser. No. 467,180
Int. Cl. B05c 11/04, 1/00
U.S. Cl. 156—584
11 Claims

ABSTRACT OF THE DISCLOSURE

A splitting machine for removing thin backing sheets from laminates having intermediate layers of adhesive. The machine includes a rigid reference plate which receives the laminates, and which cooperates with a resilient transport roller for advancing the laminates over the reference surface. A separating blade engages the laminate as it emerges from between the reference plate and the transport roller, and splits the backing sheet away from the laminate. A guide member directs the removed backing sheet away from the exposed adhesive coating on the remainder of the laminate, and an activating roller applies solvent to the exposed adhesive.

---

This application is a continuation-in-part of copending Ser. No. 366,754, filed May 12, 1964, entitled Method and Apparatus for Removing Backing Sheets from Thin Laminates.

The present invention relates generally to the removal of backing sheets from thin laminates having intermediate layers of adhesive and, more particularly, to the removal of paper backing sheets from individual pre-cut metal foil appliques.

As is well known, thin metal appliques are conventionally made by laminating aluminum foil to an adhesive-coated backing paper which is treated with a release agent so that the adhesive has greater affinity for the foil than for the backing paper. Consequently, when the foil and paper are separated from each other, the adhesive is transferred to the foil applique so that the applique may be affixed to the desired surface. An alternative process comprises applying a coating of a solvent activatable adhesive to the underside of the foil and then applying a backing paper over the adhesive coating. In order to releasably bond the backing paper to the adhesive coating, the adhesive may be slightly activated at the time the backing paper is applied.

Until a few years ago, the thin metal appliques were always packaged as individual units comprising one or some small number of pre-cut appliques laminated to a corresponding sheet of backing paper. However, because of difficulties encountered in stripping the individual appliques from the backing sheets, methods have been devised within the last few years for packaging the appliques on continuous rolls of backing tape. This permits the appliques to be removed quickly and easily by simply drawing the continuous tape around a sharp corner, thereby causing the relatively stiff appliques to separate from the tape.

Although the continuous roll packaging has been commercially successful with relative thin appliques, it is not applicable to relatively thick appliques which are too stiff to be wound into continuous rolls. Moreover, the fact remains that it is still more economical to manufacture the appliques as individual units rather than in continuous rolls. Thus, it has long been recognized that there is a need for a method of automatically removing the backing sheets from pre-cut applique laminates without the use of tabs or the like. The difficulty in separating the backing paper from the individual appliques is due to a number of reasons. For example, the various shapes of the appliques are usually obtained by laminating a relatively large sheet of printed foil to a corresponding sheet of transfer tape, and then stamping the desired applique shapes from the resulting laminate. As a result, the foil and backing paper are crimped tightly together around the edge of each applique due to the forces applied by the cutting edges of the stamping die, and it is difficult to split the foil and paper apart.

In addition, the adhesive layer between the backing paper and the foil tends to set up to a certain extent during shipping and storage periods prior to use, making it even more difficult to split the two plies apart. Moreover, the foil appliques are so thin that they are easily buckled or otherwise damaged by mechanical separating members. Furthermore, the separation must be achieved without scraping or gouging the adhesive from the underside of the foil, and without causing the adhesive to stick to the separating member.

It is a primary object of the present invention to provide an improved method and apparatus for automatically separating a thin sheet of backing paper, or other backing material, from individual pre-cut laminates. It is another object of the invention to provide such a method and apparatus which is applicable to relatively thick appliques, on the order of 0.020 inch for example, as well as relatively thin appliques. Yet another object is to provide such a method and apparatus which removes the backing sheets from the laminates at high speeds without damaging the laminates and without removing the adhesive in the remaining portions of the laminates.

It is a further object of the invention to provide an improved method and apparatus of the foregoing type which is capable of removing backing paper from thin foil appliques even though the foil and paper are crimped tightly together around the periphery of the applique. A related object is to provide such a method and apparatus which is capable of separating the foil and paper even though the intermediate layer of adhesive has been partially set up due to extended storage periods.

Still another object of the invention is to provide an improved method and apparatus of the type described which prevents the adhesive exposed by the removal of the backing paper from sticking to the separating member. A further object of the invention is to provide such a method and apparatus which can be used to remove the backing paper from appliques of different thicknesses, without adjustment, and without gouging the adhesive coating.

It is a still further object of one particular aspect of the invention to provide an improved method and apparatus for automatically removing a thin backing sheet from an applique coated with a solvent activatable adhesive and then immediately activating the exposed adhesive coating with a suitable solvent. In this connection, it is another object of the invention to provide such a method and apparatus which promptly moves the backing sheet away from the path of the applique to enable solvent activation of the exposed adhesive.

Other objects and advantages of the invention will become apparent upon reading the following description and appended claims and upon reference to the drawings, in which:

FIGURE 1 is a perspective of a splitting machine embodying the present invention;

FIG. 2 is a top plan view of the interior structure of the machine of FIG. 1 with certain portions broken away to show the underlying structure;

FIG. 3 is an end elevation taken from the left-hand end of FIG. 2 with a portion broken away to show the mounting structure for the bearing blocks;

FIG. 4 is an end elevation taken along line 4—4 in FIG. 2;

FIG. 5 is a perspective showing an applique laminate just as it approaches the edge of the splitting blade;

FIG. 6 is another perspective showing the applique laminate after it has been advanced part of the way over the separating member;

FIG. 7 is an enlarged view of a fragment of FIG. 4 showing the relative positions of the reference surface, the transport member, the separating member, and the laminate;

FIG. 9 is a front elevation view of a portion of the machine shown in FIG. 8 with certain portions broken away to show the internal structure;

FIG. 10 is a vertical section taken along line 10–10 in FIG. 8; and

FIG. 11 is a vertical section taken along line 11–11 in FIG. 8.

Figure 8:
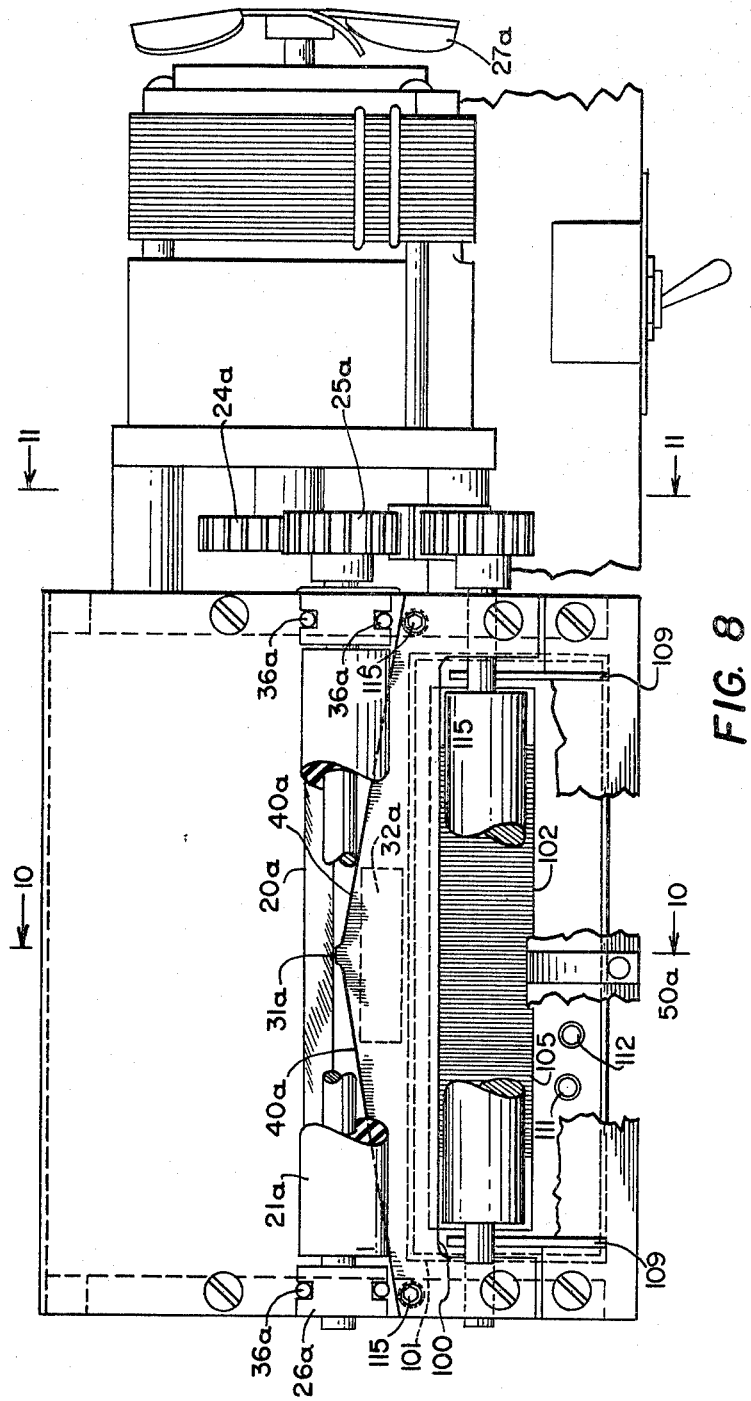
FIG. 8 is a top plan view of a modified embodiment of the invention including automatic solvent activation means, with portions of the machine being broken away to show the underlying structures.

While the invention will be described in connection with a preferred embodiment, it is to be understood that the invention is not to be limited to the disclosed embodiment but, on the contrary, it is intended to cover the various modifications and equivalent arrangements included within the spirit and scope of the appended claims.

Turning now to the drawings, there is shown in FIG. 1 a stripping machine 10 constructed in accordance with the present invention, having a one-piece housing 11 mounted on a pair of leg members 12 so as to elevate the main body portion of the machine above the supporting surface. Although the invention will be described herein with particular reference to foil appliques having paper backing sheets, it will be understood that the invention is equally applicable to the removal of backing sheets from a variety of thin laminates, such as appliques of metallized Mylar or stiff paper for example. Moreover, the invention is equally applicable to both relatively thick appliques, having a thickness of about 0.020 inch for example, and relatively thin appliques having a thickness of 0.003 inch or less.

As will become apparent as the discussion proceeds, the left-hand portion of the machine includes a stripping assembly having an inlet slot 13 in the upper portion of the machine for receiving the pre-cut applique laminates one by one as they are placed in the machine by the operator for stripping of the backing paper, so that the appliques are made ready for application to a product or for whatever use is to be made of them. An outlet slot 14 is provided in the lower portion of the machine for discharging the adhesive-coated appliques with the backing paper removed. The discharge plate 15 below the outlet slot 14 is provided with a plurality of ridges 16 which help prevent the exposed adhesive on the discharged appliques from sticking to the machine. The right-hand portion of the machine houses the driving and cooling unit whch is turned on and off by means of a switch 17.

Turning to the internal construction of the machine shown in FIGS. 2–6, as the paper-backed applique is fed into the machine through slot 13, it engages a rigid reference plate 20 which is secured, as by welding, to a pair of frame members 20a, within the housing 11 with the upper portion of the plate positioned adjacent the inlet slot 13. The reference plate 20 is inclined downwardly so that the applique laminate is advanced downwardly thereover by gravity with the backing paper facing the reference plate. In order that a single machine may be used for a wide range of applique sizes, the reference plate 20 should be sufficiently wide to accommodate the largest appliques to be used in any given installation. The upper surface of the reference plate should be adapted to suport the laminates in a substantially flat (inclined) position, and should be sufficiently smooth to permit the laminates to pass smoothly thereover without catching.

As the laminate approaches the lower end of the reference plate 20, it is engaged by a resilient rotating roller 21 mounted on a shaft 22 which is driven by a constant speed motor 23 via a pair of gears 24 and 25. A typical operating speed for the roller is 250 r.p.m. The shaft 22 is journalled in a pair of bearing blocks 26 mounted on opposite sides of the reference plate 20, with the roller 21 being either in light contact with the reference plate or spaced therefrom a distance less than the thickness of the laminated applique. The roller 21 may be made of rubber, for example, and preferably extends across the full width of the reference plate. For the purpose of cooling the machine while in operation, a fan 27 is connected to the opposite end of the motor drive shaft from the gears 24, 25.

In accordance with one main aspect of the present invention, there is provided a separating member having a narrow sharp blade projecting a predetermined distance from one edge thereof for penetrating between the backing paper and the intermediate adhesive layer of the laminate so as to initiate the splitting of the backing paper away from the adhesive layer over a small area, and a pair of relatively dull or blunt spreading edges tapering back away from the base of the projecting blade on opposite sides thereof for gradually stripping the backing paper away from the adhesive layer, beginning at the split initiated by the projecting blade and progressing outwardly to the opposite edges of the applique. Thus, referring to FIGS. 5 and 6, as the applique laminate 30 emerges from between the reference plate 20 and the roller 21 under the positive driving action of the roller, the laminate engages a narrow sharp blade 31 projecting from the upper edge of a rigid separating member 32. The separating member is held firmly in an inclined position substantially parallel to the reference plate 20, such as by bolting the separating member to the frame members 20a as illustrated.

The purpose of the narrow blade 31 is to initiate stripping of the backing paper 33, which is treated with a release agent for easy removal, away from the intermediate adhesive layer 34 without damaging or buckling the remaining portion of the laminate. Accordingly, the edge of the blade 31 must be positioned above the surface of the reference plate 20 by a distance about equal to the thickness of the backing paper 33 so that the blade strikes the advancing laminate directly between the backing paper 33 and the adhesive layer 34. The blade 31 is tapered in the direction of the thickness of the laminate so that the blade forces the narrow portion of the backing sheet 33 engaged thereby progressively farther away from the adhesive layer 34 as the blade penetrates into the laminate.

It will be appreciated that the entire applique laminate is extremely thin, the foil portion being on the order of 3 to 5 thousandths of an inch and the total laminate thickness being on the order of 5 to 7 thousandths. Consequently, it is critical that accurate alignment be maintained between the advancing applique and the blade 31 in order to avoid damage to the applique. Thus, it is important that the applique laminate be held firmly against the reference plate 20 until the laminate is engaged by the splitting blade. For this purpose, the corner of the reference plate 20 is provided with a small notch 35 directly opposite the blade 31 so as to permit the blade to slightly overlap the reference plate. With this arrangement, the laminate is prevented from diving under the blade, and the initial engagement between the blade and the laminate is made while the laminate is still held firmly between the reference plate and the resilient roller.

In accordance with one aspect of the invention, the resilient transport member is spring-mounted so that the entire member can yield slightly as the applique laminate is passed thereunder, thereby permitting the stripping of relatively thick laminates without gouging or scraping of the adhesive coating due to excessive pressure of the laminate against the splitting blade. Thus, each of the two bearing blocks 26 which hold the roller shaft 22 is fitted between a pair of guide posts 36 threaded into the frame members 20a, with a spring clip 37 biasing the bearing block down between the two posts. This permits the bearing blocks to ride up between the guide posts slightly in the event that the roller 21 presses too firmly against the laminate. This feature of the invention is especially important in cases where the machine is to be used with laminates of varying thicknesses, even though the backing paper may be of the same thickness in all cases.

In order to peel or strip the backing paper from the laminate after the initial split has been made by the narrow projecting blade, the separating member is provided with a pair of relatively dull or blunt edges 40 which taper back away from the base of the projecting blade 31. As the applique passes over the blade 31, these edges 40 wedge between the backing paper and the adhesive coating, beginning at the split formed by the blade and progressing to the opposite side edges of the applique.

It will be seen that the entire arrangement of the separating member is designed to remove the backing paper rapidly and efficiently without damaging the delicate foil applique or the thin adhesive coating thereon, and without causing the laminate to buckle and become hung up in the machine. Thus, the projecting chisel-like blade 31 is sharp enough to penetrate between the backing paper and the adhesive coating, even though the stamping die may have crimped the applique and backing paper tightly together at the laminate edges, and even though the adhesive coating may have set up somewhat during extended storage. However, this initial splitting by the sharp blade is restricted to a very narrow area so that there is a minimum of resistance to the advancing blade and, as a result, there is little likelihood of damage to the applique. Thus, the blade edge should be less than about ¼ inch wide, and is preferably less than ⅛ inch. Of course, the same effect may be achieved by using a wider blade which is curved so that the actual point of entry is still extremely narrow.

After the initial split has been made, the main portion of the stripping operation is carried out by the wedging action of the blunt edges 40, so that there is no danger whatever of rupturing the applique or its adhesive coating. In order to strip the backing sheet gradually, progressing from the initial split out to the side edges of the laminate, the angle of taper of the edges 40 should be at least about 10°, and is preferably at least 20°. It will be appreciated that the applique is no longer in engagement with the roller 21 by the time the laminate is engaged by the edges 40, so there is no tendency for the edges 40 to scrape or gouge the adhesive. In the particular embodiment illustrated in the drawings, the edges 40 are rounded to further insure against any such scraping action.

It will be recognized that with the separating member of this invention, it is not necessary for the narrow splitting blade to enter the laminate at its midpoint. Consequently, no transverse guiding means are required, and the machine is free to receive laminates of practically any width. With the blunt spreading edges tapering back away from both sides of the base of the blade, complete removal of the backing sheet is assured regardless of the location of the initial point of entry. Moreover, the separation continues even though the laminate moves transversely as it is advanced and, indeed, even though the laminate wanders completely off the blade after the initial penetration.

In accordance with another feature of the invention, a guiding member is associated with the separating member for guiding the applique away from the main surface of the separating member so as to prevent the exposed adhesive coating on the applique from sticking to the separating member. Thus, in the particular embodiment illustrated in the drawings, a leaf spring 50 is mounted on the separator 32 with an angular bend 51 being provided near one end of the spring to provide a guiding surface for the applique. As the applique is advanced over the separator, it engages the bend 51 and is thereby guided out through the slot 14 with minimum amount of physical engagement. It will be understood that other guiding means, such as a solid ramp for example, could be substituted for the leaf spring 50.

Another guide member 52 is provided below the separating member 32 for the purpose of guiding the removed backing paper through an outlet in the bottom of the machine. Alternatively, a removable receptacle could be provided in the lower portion of the machine to collect the removed backing paper.

In accordance with a further aspect of the invention, an adjusting means is associated with the splitting blade for making fine adjustments in the elevation of the blade edge above the top surface of the reference blade so that the blade can be precisely "tuned" to penetrate exactly between the backing sheet and the intermediate adhesive layer of the advancing laminate. Thus, as shown in FIGURE 4, an adjustment screw 60 is threaded through a hole 61 provided in the center of the guide member 52. The upper end of the screw 60 engages the lower surface of the central portion of a separating member 32 so that advancement of the screw against the member 32 bows the central portion of the separating member upwardly, while the side portions of the separating member remain firmly bolted to the frame members 20a. This adjustment feature is useful not only for initial tuning of the separating member for any given laminate, but also permits rapid and accurate adjustment of the machine to accommodate laminates having backing sheets of varying thicknesses.

In FIGURES 8–11, there is illustrated a modified form of the invention for use with applique laminates having a solvent activatable adhesive. The general layout of this machine is similar to that of the machine of FIGURES 1–7 and, for convenience, similar parts have been identified by similar reference numerals with the addition of the distinguishing suffix a. Thus, the applique laminate to be stripped is fed onto an entrance plate 20b provided for guiding the laminate between a rigid reference plate 20a and a resilient rotating transport roller 21a. In this particular embodiment, it is preferred to have the applique laminate follow a substantially horizontal path through the machine because of the slippery nature of the product after the adhesive coating thereon has been solvent activated. Accordingly, the entrance plate 19 and the reference plate 20a are mounted in a substantially horizontal plane rather than being inclined downwardly as in the case of the machine in FIGURES 1–7. In order to positively advance the applique laminate as it enters the nip of the transport roller 21a, the roller is driven by a constant speed motor 23a via a pair of gears 24a and 25a. A cooling fan 27a is mounted on the opposite end of the motor drive shaft from the gears 24a, 25a.

As the applique laminate emerges from the nip of the transport roller 21a and the reference plate 20a, it is engaged by a narrow chisel-like blade 31a projecting from the leading edge of a rigid separating member 32a. The separating member 32a is mounted firmly in a horizontal position substantially parallel to the reference plate 20a, with the leading edge of the blade 31a positioned above the surface of the reference plate 20a by a distance about equal to the thickness of the backing paper on the applique laminate. Consequently, the blade 31a strikes the advancing laminate directly between the backing paper and the intermediate solvent activatable adhesive coating so as to split the backing paper away from the adhesive coating. The blade is tapered in the direction of the thickness of the laminate so that the blade forces the narrow portion of the backing sheet engaged thereby progressively farther away from the adhesive coating as the blade penetrates into the laminate.

In order to enable the splitting blade 31 to penetrate into the advancing laminate without gouging or scraping the adhesive coating due to excessive pressure of the laminate against the splitting blade, the transport roller 21a is mounted in a pair of bearing blocks 26a which are fitted between a pair of guide posts 36a threaded into the side frame members, and a spring clip 37a biases each bearing block down between the two posts. This permits the bearing blocks to ride up between the guide posts slightly in the event that the roller 21a presses too firmly against the laminate.

As the applique laminate continues to advance over the splitting blade 31a under the positive drive of the transport roller 21a, the laminate passes over a pair of relatively dull or blunt edges 40a which wedge between the backing paper and the adhesive coating to continue the stripping operation initiated by the blade 31. As will be apparent from the ensuing discussion, it is preferred to have a relatively small taper on the blunt edges 40a in this particular embodiment, so as to strip the backing paper across the full width of the adhesive coating as rapidly as possible. This enables the exposed adhesive to be immediately activated by solvent application.

In accordance with one important aspect of this embodiment of the invention, activating means are operatively associated with the separating member for applying a solvent to the exposed solvent activatable coating as the backing sheet is stripped therefrom. Thus, an elongated transverse opening 100 is formed in the rear portion of the separating member 32a, and a solvent reservoir in the form of an elongated trough 101 is mounted directly beneath the opening 100. Consequently, as the applique laminate advances over the separating member 32a, it passes over the transverse opening 100 and the solvent trough 101 disposed thereunder for immediate activation of the exposed adhesive coating. It is important to activate the adhesive as soon as possible after the backing sheet is removed because the exposed solvent activatable adhesive is often slightly pressure sensitive.

For the purpose of transferring liquid solvent from the trough 101 to the exposed adhesive coating on the underside of the applique advancing thereover, a solvent transfer roller 102 is rotatably mounted in the upper portion of the trough 101. This transfer roller 102 is positively driven by the same drive motor 23a which drives the resilient transport roller 21a. The driving connection between the motor 23a and the transfer roller 102 comprises a pair of gear wheels 103 and 104 which are operatively connected to the main drive gear 24 on the motor shaft. As the transfer roller 102 is rotated, a multiplicity of circumferential grooves 105 in the roller surface continuously pick up liquid solvent from the solvent pool 106 within the trough 101 and transfer the solvent to the exposed adhesive coating passing over the upper surface of the transfer roller. This solvent activates the exposed adhesive, and the applique is then ready for application to the desired surface.

It is important that the amount of solvent transferred to the adhesive coating on the underside of the applique be sufficient to fully activate the adhesive coating without removing any substantial portion of the adhesive from the underside of the applique. The degree of solvent wetting achieved in this operation is determined by the nature of the surface of the transfer roller 102, the speed of both the transfer roller and the applique, and the size of the roller, i.e., the area of engagement between the transfer roller and the adhesive coating. In cases where relatively high speeds are desirable or where relatively large amounts of solvent must be applied to the adhesive, it is within the spirit and scope of this invention to add one or more additional transfer rollers in a tandem arrangement.

In order to insure that the solvent is applied uniformly across the surface of the adhesive coating, and also to maintain the applique in continuous engagement with the positively driven transfer roller, an idler roller 107 is rotatably mounted directly above the transfer roller 102. The shaft 108 of the idler roller 107 is journaled in a pair of end mounting brackets 109. The two mounting brackets 109 receive the ends of the roller shaft 108 in a pair of elongated vertical slots 110 so that the idler roller 107 is free to move vertically as an applique is passed thereunder. Thus it will be appreciated that the idler roller 107 is in effect self-adjusting to accommodate appliques of different thicknesses.

For the purpose of replenishing the supply of liquid solvent in the reservoir tray 101, a solvent feed pipe 111 is mounted in the upper portion of the tray 101 for connection to a solvent supply bottle or the like. When it is desired to empty the tray 101, such as for cleaning purposes for example, the solvent can be discharged through an outlet pipe 112 mounted in the bottom of the tray 101.

In accordance with another aspect of this embodiment of the invention, guide means are associated with the leading edge of the separating member 32a for directing the backing sheet away from the exposed adhesive coating as the backing sheet is stripped therefrom. Thus, as shown most clearly in FIGURE 10, a downwardly projecting guide plate 113 is welded to the underside of the separating member 32a between the two blunt edges 40a. As the backing sheet is stripped away from the adhesive coating by the blade 31, the backing sheet engages the guide plate 113 which directs it downwardly away from the path of the advancing applique, as illustrated at 33a in FIGURE 10. Since the guide plate 113 is located between the two blunt edges 40a of the separating member, it also facilitates the peeling of the remaining portion of the backing sheet from the laminate.

As the applique emerges from between the rollers 102 and 107 with activated adhesive on the underside thereof, it is passed over an exit plate 114 mounted on the two side frame members. In order to prevent the activated adhesive from sticking to this exit plate, or to any other part of the machine, a guide ramp 50a is preferably mounted on top of the plate 114. As the adhesive coated applique is advanced over the exit plate 114, it engages the upper surface of the ramp 50a and is guided out through the discharge opening of the machine with a minimum area of mechanical engagement with the activated adhesive. Consequently, the activated adhesive coating is maintained substantially intact so that the applique can be firmly and permanently bonded to the desired surface.

Since the solvent reservoir is necessarily located relatively close to the separating member 32a, the cooling effect of the evaporating solvent tends to cause dimensional changes in the separating member including the critically spaced leading edge thereof. Accordingly, it is especially important in this embodiment of the invention to provide an accurate adjusting means for making fine adjustments in the elevation of the blade edge. Accordingly, two adjustable set screws 115 are threaded into the side frame members under the front corners of the separating member 32a. Hexagonal recesses are formed in the top ends of these two set screws, and corresponding openings are formed through the corners of the separating member 32a so that the operator can insert a hexagonal wrench into the set screws for the purpose of making fine adjustments in the blade elevation. Thus, it is relatively simple to make adjustments for any dimensional changes in the blade due to the cooling effect of solvent evaporation, and also to accommodate applique laminates of different thicknesses.

While one specific form of the invention has been illustrated and described herein in some detail, it will be apparent that the same is susceptible of numerous modifications within the spirit and scope of the invention. For example, the rigid reference plate could be replaced by a rigid metal roller or any other supporting means capable of maintaining proper alignment between the advancing laminated appliques and the separating member. Similarly, although the invention has been described with particular reference to a rubber roller as the resilient transporting member, it will be understood that other suitable transport means, such as an endless belt for example, could be used to convey the applique laminates while holding them firmly against the reference member. Moreover, a plurality of blades could be provided to achieve the initial splitting, providing the total area of initial engagement is sufficiently small to prevent damage to the laminate.

It can be seen that this invention provides a method and apparatus which is capable of removing the paper backing from individual pre-cut foil appliques at high speeds without damaging the appliques and without scraping adhesive off the undersides thereof. These results can be achieved repetitively with laminates of varying thicknesses and with large numbers of laminates over extended operating periods. Moreover, the invention enables the backing paper to be split away from the adhesive in a rapid fashion, even though the edges of the laminate have been crimped tightly together and bonded by partially set adhesive, and yet there is practically no danger of rupturing the applique. In addition, the apparatus may be used with appliques of widely varying widths and thicknesses without any machine adjustments, and without gouging the applique or its adhesive coating.

We claim as our invention:

1. A splitting machine for removing thin backing sheets from individual laminates having intermediate layers of adhesive, said machine comprising the combination of a rigid reference plate adapted to receive the individual laminate and to support the same as it is advanced thereacross, a resilient roller rotatably mounted over said reference plate for advancing the laminate while holding the laminate firmly against the reference plate, driving means for rotating the resilient roller, and a separating member arranged to engage the laminate as it emerges from between the reference plate and the roller, said separating member having a narrow sharp blade projecting therefrom with the edge of the blade positioned immediately adjacent the edge of the reference plate and a predetermined distance above the top surface of the reference plate so that the blade penetrates between the backing sheet and the intermediate adhesive layer of the advancing laminate to initiate the splitting of the backing sheet away from the laminate over a small area, and a pair of relatively blunt spreading edges extending laterally away from opposite sides of the base of said narrow projecting blade for gradually stripping the backing sheet off the laminates, beginning at the split initiated by the projecting blade and progressing outwardly to the opposite edges of the laminate.

2. A splitting machine for removing thin backing sheets from individual laminates having intermediate layers of adhesive, said machine comprising the combination of a rigid reference plate adapted to receive the individual laminate and to support the same as it is advanced thereacross, a resilient roller rotatably mounted over said reference plate for advancing the laminate while holding the laminate firmly against the reference plate, said resilient roller being spring mounted so that said roller may yield away from said reference plate under pressure from relatively thick laminates whereby scraping of the intermediate adhesive layer is effectively prevented, and a constant speed motor for rotating the resilient roller, and a separating member arranged to engage the laminate as it emerges from between the reference plate and the roller, said separating member having a narrow sharp blade projecting therefrom with the edge of the blade positioned immediately adjacent the edge of the reference plate and a predetermined distance above the top surface of the reference plate so that the blade penetrates between the backing sheet and the intermediate adhesive layer of the advancing laminate to initiate the splitting of the backing sheet away from the laminate over a small area, and a pair of relatively blunt spreading edges extending laterally away from opposite sides of the base of said narrow projecting blade and progressing outwardly to the opposite edges of the laminated.

3. A splitting machine for removing thin backing sheets from individual applique laminates having intermediate layers of adhesive, said machine comprising the combination of a housing having a horizontally extending inlet slot in an upper portion of the housing and a horizontally extending outlet slot in a lower portion of the housing, a rigid reference plate mounted within said housing in an inclined position with the upper end of the plate positioned adjacent the inlet slot for receiving an applique laminate inserted therethrough whereby said laminate is advanced downwardly over the inclined plate surface by gravity, a resilient transport roller mounted over the lower end of said plate for engaging said laminate and continuing to advance the laminate while holding it firmly against the inclined surface of the reference plate, said roller being journalled in a pair of spring mounted bearing blocks to permit the roller to yield away from the reference plate under pressure from a relatively thick laminate, driving means for rotating said transport roller, a separating plate mounted directly below said roller in an inclined position substantially parallel to said reference plate, said separating plate having a narrow sharp blade projecting from the upper edge thereof for engaging the laminate as it emerges from between the reference plate and the roller, the edge of said blade being positioned immediately adjacent the lower edge of said reference plate so that said laminate is still held firmly in the reference position when first engaged by the blade, said blade being positioned a predetermined distance above the surface of the reference plate so that the blade penetrates between the backing sheet and the intermediate adhesive layer of the advancing laminate to initiate splitting of the backing sheet away from the adhesive over a small area, the base of said blade merging with a pair of relatively blunt spreading edges extending laterally and downwardly away from opposite sides of the base of said blade for gradually stripping the backing sheet off the laminate, beginning at the split initiated by the projecting blade and progressing outwardly to the side edges of the laminate, and guide means associated with said separating plate below said blade for guiding the adhesive-coated applique out through said outlet slot and preventing sticking of the applique to the separating plate.

4. A splitting machine for removing thin backing sheets from individual laminates having intermediate layers of adhesive, said machine comprising the combination of a rigid reference surface adapted to support the laminate as it is advanced thereover, a resilient transport member rotatably mounted over said reference surface for advancing the laminate while holding the laminate firmly against the reference surface, means for driving the resilient transport member, and a separating member arranged to engage the laminate as it emerges from between the reference surface and the transport member, said separating member having a narrow sharp blade projecting therefrom with the edge of the blade positioned immediately adjacent the edge of the reference surface and a predetermined distance above the reference surface so that the blade penetrates between the backing sheet and the intermediate adhesive layer of the advancing laminate to initiate the splitting of the backing sheet away from the laminate over a small area, and a pair of relatively blunt spreading edges extending laterally away from opposite sides of the base of said narrow projecting blade for gradually stripping the backing sheet off the laminates, beginning at the split initiated by the projecting blade and progressing outwardly to the oposite edges of the laminate.

5. A splitting machine for removing thin backing sheets from individual laminates having intermediate layers of adhesive, said machine comprising the combination of a rigid reference surface adapted to support the laminate as it is advanced thereover, a resilient transport member rotatably mounted over said reference surface for advancing the laminate while holding the laminate firmly against the reference surface, means for driving the resilient transport member, and a separating member arranged to engage the laminate as it emerges from between the reference surface and the transport member, said separating member having a narrow sharp blade projecting therefrom with the sharp edge of the blade positioned immediately adjacent the edge of the reference surface so that the blade penetrates between the backing sheet and the intermediate adhesive layer of the laminate to initiate the splitting of the backing sheet away from the adhesive, the sharp edge of said blade being less than about ⅛ inch wide with the blade being tapered in the direction of the thickness of the laminate so as to force the backing sheet progressively farther away from the adhesive, and a pair of relatively blunt spreading edges tapering laterally away from opposite sides of the base of the blade at an angle of at least 20° from the sharp edge of the blade for gradually stripping the backing sheet off the laminates, beginning at the split initiated by the projecting blade and progressing outwardly to the opposite edges of the laminate.

6. A splitting machine for removing thin backing sheets from individual laminates having intermediate layers of adhesive, said machine comprising the compination of a reference surface adapted to support the laminate as it is advanced thereover, a resilient transport member rotatably mounted over the reference surface for advancing the laminate while holding the laminate firmly against the reference surface, means for driving the resilient transport member, and a separating member overlapping the reference surface to engage the laminate while it is still held between the transport member and the reference surface for splitting the backing sheet away from the laminate.

7. A splitting machine for removing thin backing sheets from individual laminates having intermediate layers of adhesive, said machine comprising the combination of a rigid reference surface adapted to support the laminate as it is advanced thereover, a resilient transport member rotatably mounted over said reference surface for advancing the laminate while holding the laminate firmly against the reference surface, means for driving the resilient transport member, and a separating member arranged to engage the laminate as it emerges from between the reference surface and the transport member, said separating member having a narrow sharp blade projecting therefrom with the edge of the blade positioned immediately adjacent the edge of the reference surface and a predetermined distance above the reference surface, means for making fine adjustments in the elevation of the blade edge above the surface so that the blade penetrates directly between the backing sheet and the intermediate adhesive layer of the advancing laminate to initiate the splitting of the backing sheet away from the laminate over a small area, and a pair of relatively blunt spreading edges extending laterally away from opposite sides of the base of said narrow projecting blade for gradually stripping the backing sheet off the laminates, beginning at the split initiated by the projecting blade and progressing outwardly to the opposite edges of the laminate.

8. Apparatus for preparing individual appliques for application to a desired surface, said appliques having a coating of solvent activatable adhesive on the undersides thereof and a backing sheet covering the adhesive coating, which apparatus comprises the combination of a reference surface adapted to support the applique as it is advanced thereover, a resilient transport member rotatably mounted over the reference surface for advancing the applique while holding the applique firmly against the reference surface, a separating member arranged to engage the leading edge of the applique for stripping the backing sheet away from the applique and the adhesive coating thereon, guide means associated with said separating member for directing the backing sheet downwardly away from the exposed adhesive coating as the backing sheet is stripped away from said coating, and activating means operatively associated with said seperating member and said guide means for applying a solvent to the exposed activatable adhesive coating as said backing sheet is stripped therefrom for activating the adhesive.

9. Apparatus for preparing individual appliques for application to a desired surface, said appliques having a coating of solvent activatable adhesive on the undersides thereof and a backing sheet covering the adhesive coating, which apparatus comprises the combination of a reference surface adapted to support the applique as it is advanced thereover, a resilient transport member rotatably mounted over the reference surface for advancing the applique while holding the applique firmly against the reference surface, a separating member arranged to engage the leading edge of the applique for stripping the backing sheet away from the applique and the adhesive coating thereon, guide means associated with said separating member for directing the backing sheet downwardly away from the exposed adhesive coating as the backing sheet is stripped away from said coating, activating means operatively associated with said separating member and said guide means for applying a solvent to the exposed solvent activatable adhesive coating as said backing sheet is stripped therefrom for activating the adhesive, and guide means for deflecting the activated adhesive-coated applique upwardly away from the rear portion of the separating member to prevent sticking of the activated adhesive to the separating member.

10. Apparatus for preparing individual appliques for application to a desired surface, said appliques having a coating of solvent activatable adhesive on the undersides thereof and a backing sheet covering the adhesive coating, which apparatus comprises the combination of a reference surface adapted to support the applique as it is advanced thereover, a resilient transport member rotatably mounted over the reference surface for advancing the applique while holding the applique firmly against the reference surface, a separating member arranged to engage the leading edge of the applique for stripping the backing sheet away from the applique and the adhesive coating thereon, guide means associated with said separating member for directing the backing sheet downwardly away from the exposed adhesive coating as the backing sheet is stripped away from said coating, activating means operatively associated with said separating member and said guide means for applying a solvent to the exposed solvent activatable adhesive coating as said backing sheet is stripped therefrom for activating the adhesive, and means for making fine adjustments in the elevation of said separating member so that it engages the leading edge of the applique laminate directly between the backing sheet and the adhesive coating.

11. Apparatus for preparing individual appliques for application to a desired surface, said appliques having a coating of solvent activatable adhesive on the undersides thereof and a backing sheet covering the adhesive coating, which apparatus comprises the combination of a reference surface adapted to support the applique as it is advanced thereover, a resilient transport member rotatably mounted over the reference surface for advancing the applique while holding the applique firmly against the reference surface, a separating member arranged to engage the leading edge of the applique for stripping the backing sheet away from the applique and the adhesive coating thereon, guide means associated with said separating member for directing the backing sheet downwardly away from the exposed adhesive coating as the backing sheet is stripped away from said coating, and a solvent reservoir mounted adjacent the stripping edge of said separating member and said guide means and a transfer roller associated with said reservoir for transferring solvent from said reservoir to the exposed coating of solvent activatable adhesive on the underside of the applique.

References Cited

UNITED STATES PATENTS

| | | | |
|---|---|---|---|
| 2,337,724 | 12/1943 | Mackie | 156—584 |
| 3,010,508 | 11/1961 | Wilson, et al. | 156—254 |
| 3,033,741 | 5/1962 | D'Amato, et al. | 156—584 |
| 3,040,802 | 6/1962 | Frazer | 156—584 |
| 3,111,872 | 11/1963 | Trippler | 156—254 |

DOUGLAS J. DRUMMOND, Primary Examiner

U.S. Cl. X.R.

83—4; 118—75, 249